(12) United States Patent
Chang et al.

(10) Patent No.: US 11,825,557 B2
(45) Date of Patent: Nov. 21, 2023

(54) SYSTEMS AND METHODS FOR PROVIDING ACCESS TO SHARED NETWORKS IN A PRIVATE NETWORK THROUGH A PROVIDER NETWORK

(71) Applicant: Verizon Patent and Licensing Inc., Basking Ridge, NJ (US)

(72) Inventors: Patricia R. Chang, San Ramon, CA (US); Thomas W. Haynes, Clayton, CA (US); John Patrick Hickey, Metuchen, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/823,683

(22) Filed: Aug. 31, 2022

(65) Prior Publication Data

US 2022/0417735 A1   Dec. 29, 2022

Related U.S. Application Data

(63) Continuation of application No. 17/198,976, filed on Mar. 11, 2021, now Pat. No. 11,470,468.

(51) Int. Cl.
| | | |
|---|---|---|
| *H04W 8/26* | (2009.01) | |
| *H04W 48/02* | (2009.01) | |
| *H04W 12/06* | (2021.01) | |
| *H04W 88/16* | (2009.01) | |
| *H04L 101/375* | (2022.01) | |

(52) U.S. Cl.
CPC ............. *H04W 8/26* (2013.01); *H04W 12/06* (2013.01); *H04W 48/02* (2013.01); *H04W 88/16* (2013.01); *H04L 2101/375* (2022.05)

(58) Field of Classification Search
CPC ....... H04W 8/26; H04W 12/06; H04W 48/02; H04W 88/16; H04W 12/08; H04W 24/02; H04L 2101/375; H04L 61/3025; H04L 61/5007
See application file for complete search history.

(56) References Cited

U.S. PATENT DOCUMENTS

| | | | | |
|---|---|---|---|---|
| 2011/0096762 | A1* | 4/2011 | Basart | H04L 12/66 370/338 |
| 2017/0195869 | A1* | 7/2017 | Knudsen | H04W 4/24 |
| 2021/0243232 | A1* | 8/2021 | Verma | H04L 63/1408 |
| 2023/0102655 | A1* | 3/2023 | Wang | H04W 76/15 370/329 |

* cited by examiner

*Primary Examiner* — Brandon J Miller

(57) ABSTRACT

A device may include a processor. The processor may be configured to: assign, within a first wireless network, an access point name (APN) to a first gateway for a shared network. The first wireless network includes the first gateway. A second wireless network includes a second gateway for the shared network, and the second gateway is assigned the APN within the second network.

20 Claims, 12 Drawing Sheets

SYSTEMS AND METHODS FOR PROVIDING ACCESS TO SHARED NETWORKS IN A PRIVATE NETWORK THROUGH A PROVIDER NETWORK

CROSS REFERENCE TO RELATED APPLICATION

This patent application claims priority to and is a continuation of U.S. patent application Ser. No. 17/198,976, filed on Mar. 11, 2021, titled "System and Method for Providing Access to Shared Networks in a Private Network through a Provider Network," the disclosure of which is incorporated by reference herein in its entirety.

BACKGROUND

Many private networks implement features of advanced telecommunication networks. For example, a private network may implement a Fourth Generation (4G) wireless network core components, or a Fifth Generation (5G) wireless network core components. In another example, the private network may use Multi-access Edge Computing (MEC) clusters (also referred to as Mobile Edge Computing clusters). The MEC clusters allow high network computing loads to be transferred onto edge servers. Depending on the location of the edge servers relative to the point of attachment (e.g., a wireless station for a user device), MEC clusters can provide various services and applications to user devices with minimal latency.

DETAILED DESCRIPTION OF PREFERRED EMBODIMENTS

The following detailed description refers to the accompanying drawings. The same reference numbers in different drawings may identify the same or similar elements.

Implementations described herein relate to a shared network. The shared network is included in or is coupled to two different networks, a first network (e.g., a private network) and a second network (e.g., a service provider network or, simply, provider network). The first network allows user equipment devices (UEs), which are subscribed to the first network, to access the shared network for services. UEs that are not subscribed to the first network (e.g., the UEs are not in the coverage areas of the first network), cannot access the services through the first network. The systems and methods described herein allow such UEs to access the services through the second network when the UEs are subscribed to the second network and are in the coverage areas of the second network.

Figure 1:
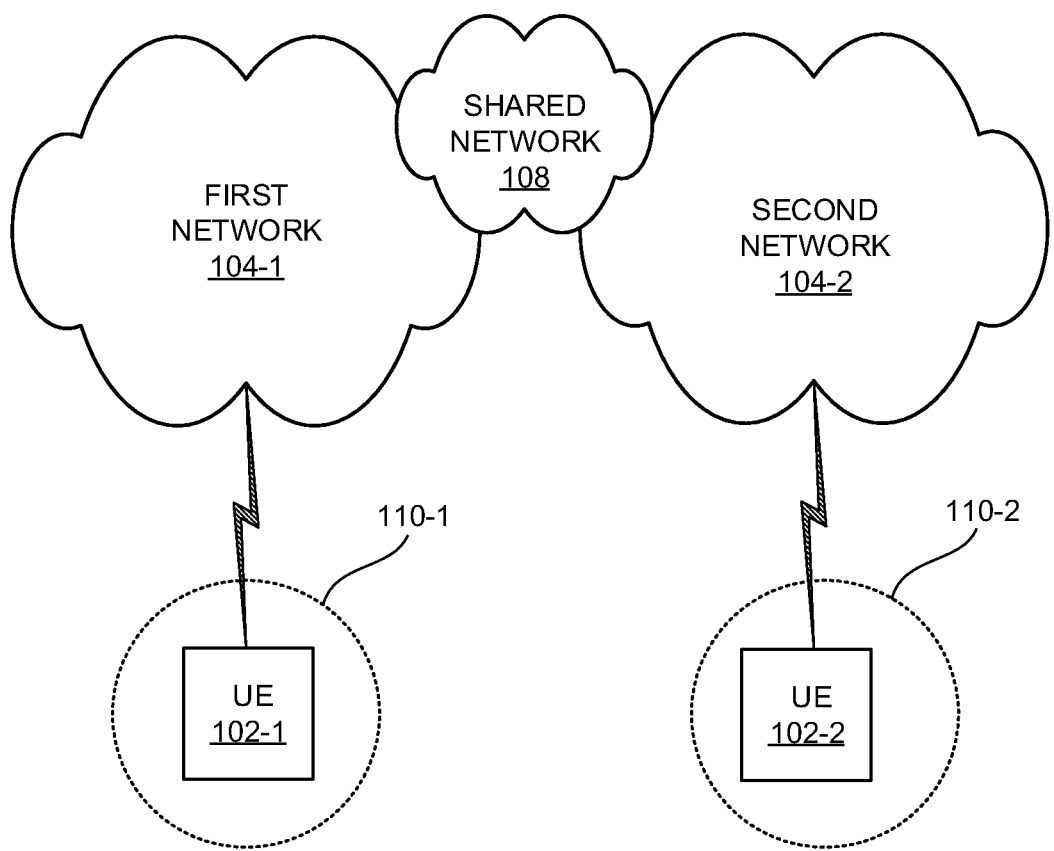
FIG. 1 illustrates concepts described herein.

FIG. 1 illustrates the concepts described herein. As shown, a first network 104-1 (e.g., a private network) includes or is coupled to or includes a shared network 108 that offers particular services. The services may include, for example, a communication service (e.g., Voice-over-IP (VoIP) service, Short Messaging Service (SMS), a content service, a computational service, a financial service, etc. In FIG. 1, UE 102-1 may access the services offered by shared network 108 as long as UE 102 is in the coverage areas of the first network 104-1. If network 104-1 is implemented as an enterprise network or a private network, services, computations, and/or storage at the enterprise site may remain private and secure. Furthermore, the services and the data at such network 104-1 (and the shared network 108) may remain local and private.

In the implementations described herein, to provide services of the first network 104-1 to UEs 102 (e.g., UE 102-2) that belong to another network 104-2 (e.g., to offer its services to a greater number of potential subscribers), a network operator of or a member of the organization associated with first network 104-1 may interact with a system which is coupled to a second network 104-2 that has presence in the areas that UE 102-2 roams. The system can trigger reconfiguration of components within second network 104-2, so that UE 102-2 at location 110-2 can receive the services offered by shared network 108 through second network 104-2. In some implementations, UE 102-2 can access the services, data, and computational resources of shared network 108 from anywhere in the world, as tong as there are connections to the internet or to another network with connections to the Internet. In such implementations, UE 102-2 may seamlessly and automatically connect to network 104-2 and thus to shared network 108 in a secure manner without a manual sign on.

Figure 2:
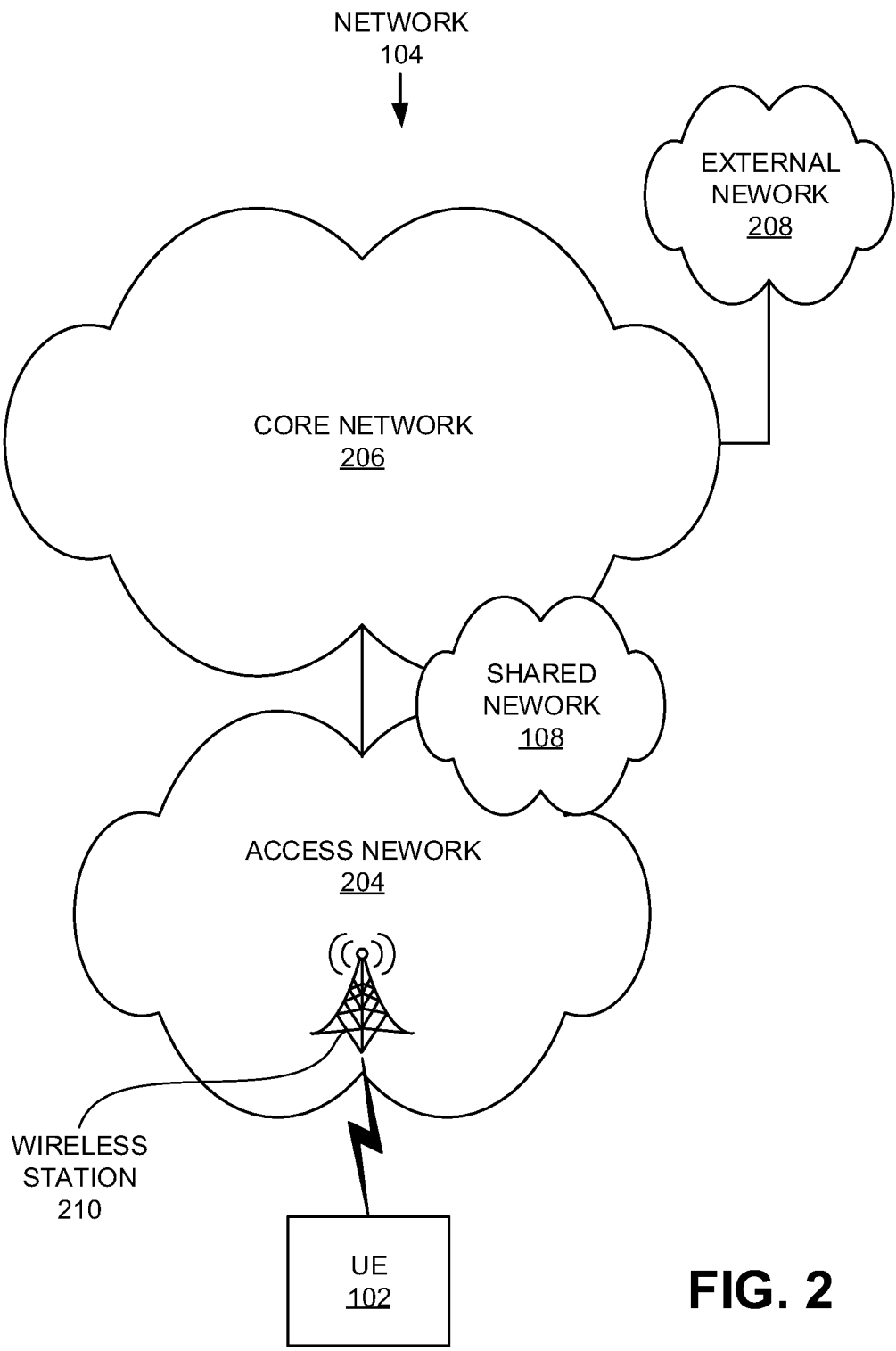
FIG. 2 depicts an exemplary wireless network according to one implementation.
Figure 10:
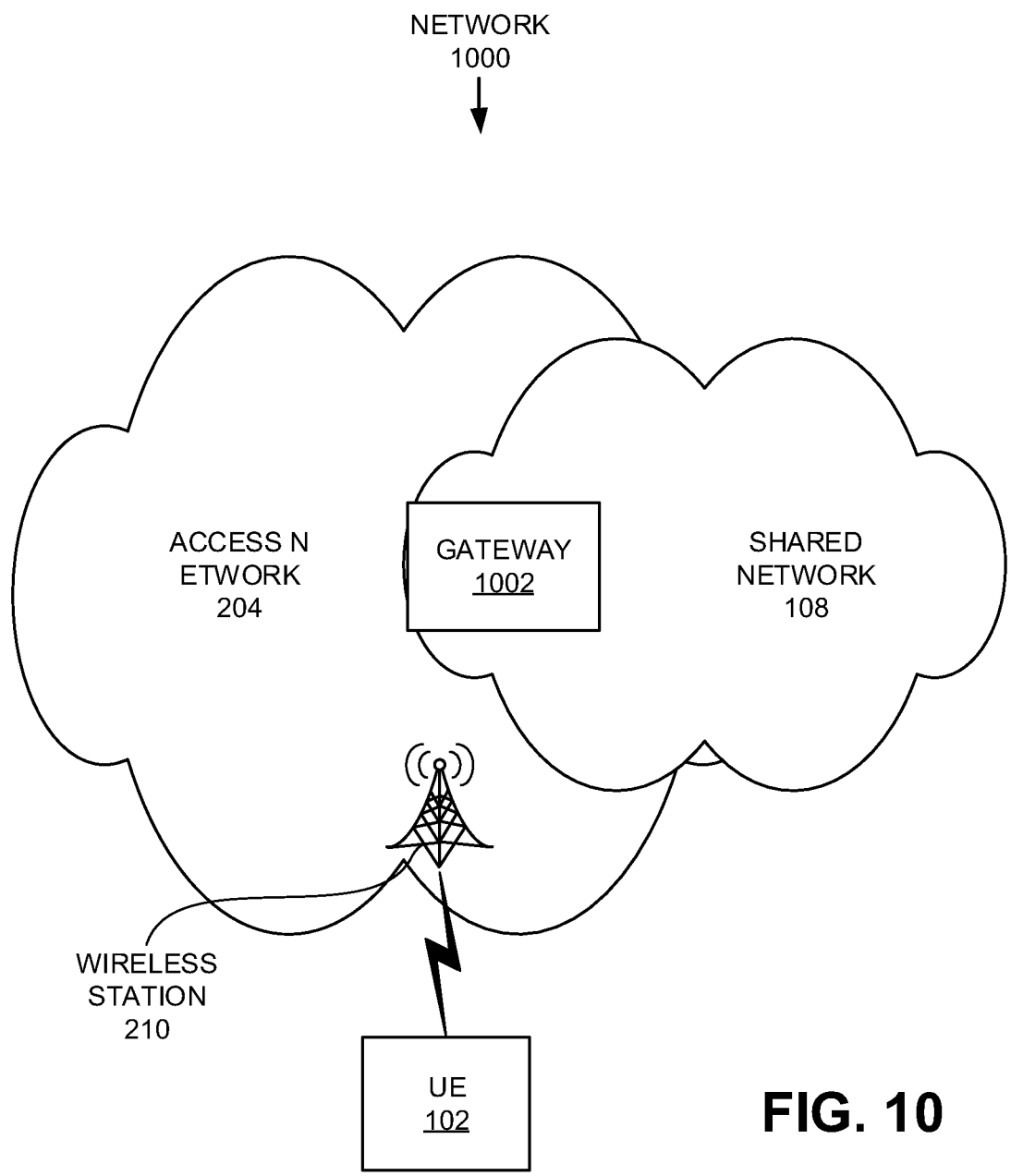
FIG. 10 shows exemplary components of a wireless network according to another implementation.

FIG. 2 illustrates an exemplary wireless network 104 connected with UE 102. Each of first network 104-1 and second network 104-2 may be implemented similarly as network 104. In some implementations, first network 104-1 may be different from network 104, and one such implementation is illustrated in FIG. 10. As Referring to FIG. 2, network 104 includes an access network 204, a core network 206 and an external network 208. Network 104 may also include shared network 108 or is coupled to shared network 108 through a backhaul link. For simplicity, FIG. 2 does not show all components that may be attached to or included in network 104 (e.g., routers, bridges, wireless access point, additional networks, additional UEs, etc.). That is, depending on the implementation, network 104 may include additional, fewer, different, or a different arrangement of components than those illustrated in FIG. 2.

UE 102 may include a wireless communication device. In some implementations, UE 102 may include a Subscriber Identity module (SIM) whose contents may be updated over-the-air (OTA). In some implementations, UE 102 may include more than one SIM, to permit UE 102 to have multiple Internet Protocol (IP) addresses. Such UEs 102 may use different IP addresses to access first network 104-1 and second network 104-2.

Examples of a UE 102 include: a smart phone; a tablet device; a wearable computer device (e.g., a smart watch); a global positioning system (GPS) device; a laptop computer; a media playing device; a portable gaming system; and an Internet-of-Thing (IoT) device. In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 102 may send packets over or to other devices in or over network 104.

Shared network 108 may provide particular network services and/or application functions. In one implementation, shared network 108 may include MEC clusters or devices. Such MEC clusters may be coupled to wireless stations to improve latency. Some MEC clusters may include specialized hardware to render particular services (e.g., graphics related services, Virtual Reality (VR)-related services, etc.). A service provided by shared network 108 may be rendered over various paths in network 104, through one or more gateways with Access Point Names (APN). When implemented within or coupled to first network 104-1, shared network 108 may be coupled to devices or components of first network 104-1 through a backhaul (e.g., optical fiber, cable, or another high bandwidth channel). Components of shared network 108 may support an IP address space, and may allocate some of the IP addresses, in the address space, to another network, such as second network 104-2, to implement a network slice (e.g., a virtual network) within shared network 108 and second network 104-2.

Access network 204 may allow UE 102 to connect to core network 206. To do so, access network 204 may establish and maintain, with participation from UE 102, an over-the-air channel with UE 102; and maintain backhaul channels with core network 206. Access network 204 may convey information through these channels, from UE 102 to core network 206 and vice versa.

Access network 204 may include a 4G (e.g., Long-term Evolution (LTE) radio network and/or a 5G radio network or other advanced radio network. These radio networks may include many wireless stations, one of which is illustrated in FIG. 2 as wireless station 210 for establishing and maintaining an over-the-air channel with UE 102.

Core network 206 may include a local area network (LAN), a wide area network (WAN), a metropolitan area network (MAN), an optical network, a cable television network, a satellite network, a wireless network (e.g., a CDMA network, a general packet radio service (GPRS) network, an LTE network (e.g., a 4G network), a 5G network, an ad hoc network, a telephone network (e.g., the Public Switched Telephone Network (PSTN)), an intranet, or a combination of networks. Core network 206 may allow the delivery of Internet Protocol (IP) services to UE 102, and may interface with other networks, such as shared network 108 and external network 208.

Depending on the implementation, core network 206 may include 4G core network components (e.g., a Serving Gateway (SGW), a Packet data network Gateway (PGW), a Mobility Management Entity (MME), etc.), 5G core network components (e.g., a User Plane Function (UPF), an Application Function (AF), an Access and Mobility Function (AMF), a Session Management Function (SMF), a Unified Data Management (UDM) function, etc.), or another type of core network components. In addition to some of the above-mentioned functional components, core network 206 may also include a Gateway Access Control Function (GWACF), a SIM-OTA server, and/or a Gateway Configuration Management function (GWCMF), as described below, with reference to FIGS. 3 and 4.

External network 208 may include networks that are external to core network 206. In some implementations, external network 208 may include packet data networks, such as an IP network.

Figure 3:
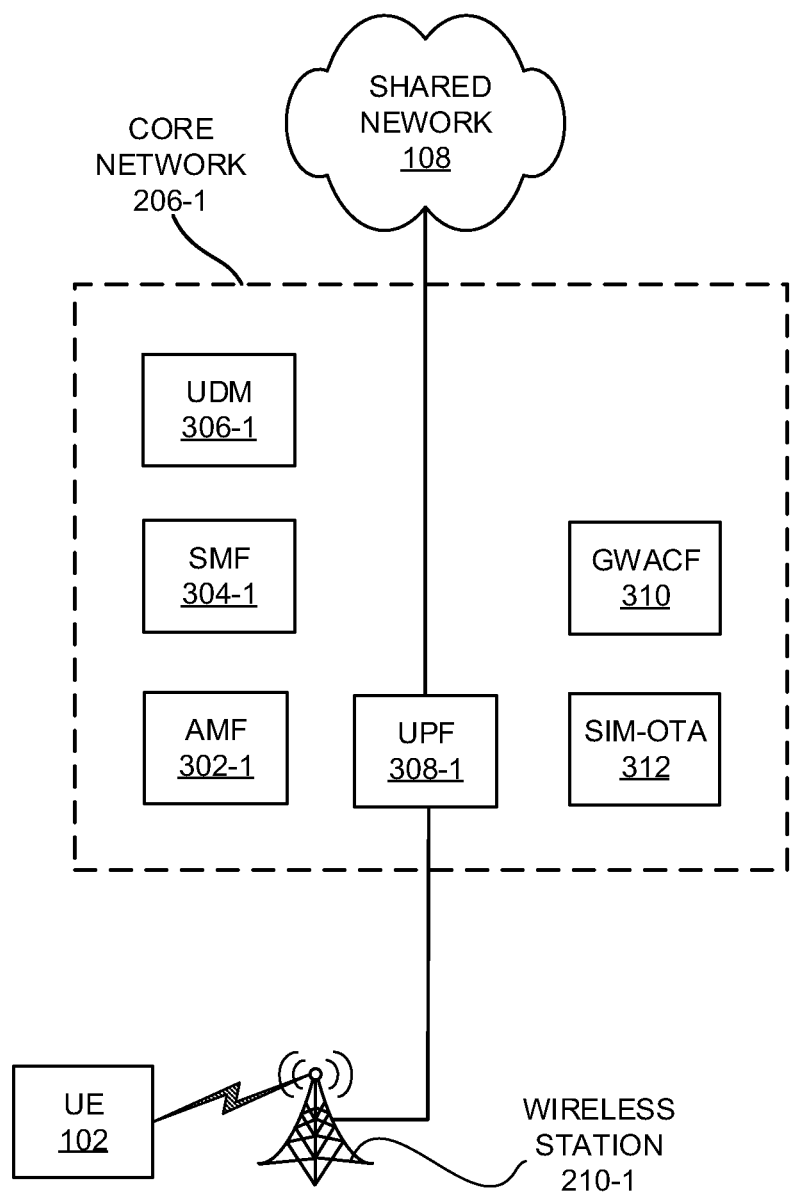
FIG. 3 shows exemplary components of the core network in a wireless network when the wireless network is implemented as a Fifth Generation (5G) network according to one embodiment.

FIG. 3 shows exemplary components in the core network 206-1 of first network 104-1 of FIG. 1 when first network 104-1 is implemented as network 104 of FIG. 2. More specifically, FIG. 3 shows core network components when core network 206-1 is implemented as a 5G core network. As shown in FIG. 3, core network 206-1 may comprise a number of network functions (NFs), which include: an Access and Mobility Function (AMF) 302-1, a Session Management Function (SMF) 304-1, a Unified Data Management function (UDM) 306-1, a User Plane Function (UPF) 308-1, a Gateway Access Control Function (GWACF) 310, and a Subscriber Identity Module-Over-the-Air (OTA) server (SIM-OTA) 312. Although core network 206-1 may include additional components, they are not illustrated in FIG. 3 for simplicity.

AMF 302-1 may perform registration management, connection management, reachability management, mobility management, lawful intercepts, Short Message Service (SMS) transport for UE 102, session management messages transport between UE 102 and SMF 304-1, access authentication and authorization, and location services management. AMF 302-1 may provide the functionality to support non-3GPP access networks and/or other types of processes.

SMF 304-1 may perform session establishment, session modification, and/or session release, perform Dynamic Host Configuration Protocol (DHCP) functions, perform selection and control of UPF 308-1, configure traffic steering at UPF 308-1 to guide the traffic to the correct destinations, terminate interfaces toward a Policy Control Function (PCF), perform lawful intercepts, charge data collection, support charging interfaces, control and coordinate charging data collection, terminate session management parts of Non-Access Stratum messages, perform downlink data notification, manage roaming functionality, and/or perform other types of control plane processes for managing user plane data.

UDM 306-1 may maintain subscription information for UEs 102 at Unified Data Repository (UDR) (not shown), manage subscriptions, generate authentication credentials, handle user identification, perform access authorization based on subscription data, perform network function registration management, maintain service and/or session continuity by maintaining assignment of SMF 304-1 for ongoing sessions, support SMS delivery, support lawful intercept functionality, and/or perform other processes associated with managing user data. UDM 306-1 may store, in a subscription profile associated with a particular UE 102, a list of network slices and networks (e.g., shared network 108) which the particular UE 102 is allowed to access.

UPF 308-1 may maintain an anchor point for intra/inter-Radio Access Technology (RAT) mobility, maintain an external Packet Data Unit (PDU) point of interconnect to a particular packet data network, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNB), and/or perform other types of user plane processes.

UPF 308-1 that serves as a gateway to shared network 108, may also be part of shared network 108, and be associated with a particular access point name (APN). For UE 102 receiving a service from shared network 108 to which UPF 308 acts as a gateway, data traffic from/to UE 102 may be routed through UPF 308-1 to/from shared network 108. In some implementations where UPF 308-1 is part of a MEC cluster, a backhaul link may connect a RAN component (e.g., a wireless station 210) to UPF 308-1.

If there are multiple shared networks 108 that core network 206-1 comprises, or if core network 206-1 is connected to multiple shared networks 108, a UPF 308 may for each of the shared networks may be implemented. Each UPF 308-1 may have its own APN and serve as a gateway to the corresponding shared network 108.

GWACF 310 may configure network functions. In some implementations, GWACF 310 may receive instructions from a client application and may configure network functions such as UPF 308-1 in accordance with the instructions. In some implementations, GWACF 310 may instantiate a UPF 308-1, or alternatively, create a network slice that includes the UPF 308-1. Configuring UPF 308-1 may include, for example, associating UPF 308-1 with a particular APN specified by the client application, so that UPF 308-1 serves as the gateway to shared network 108 within core network 206-1. If GWACF 310 creates a network slice, GWACF 310 may create the network slice within a designated network, such as shared network 108.

In addition to configuring UPF 308-1, GWACF 310 may request a GWCMF in another network (e.g., second network 104-2) connected to the shared network 108 to configure its own UPF, so that the UPF can serve as the gateway, within the second network and within the second network, to the shared network 108. When making such a request to the GWCMF, GWACF 310 may send the APN of the UPF 308-1 to the GWCMF. The GWCMF may set its UPF to have the APN within second network 104-2. That is, GWCMF may associate the UPF with the APN within second network 104-2, so that the UPF acts as the gateway, within second network 104-2, to shared network 108. Consequently, UPF 308-1 in first network 104-1 and a UPF 308-2 (FIG. 4) in second network 104-2 have the same APN but belong to different domains.

In addition to sending the APN to the GWCMF, GWACF 310 may also send one or more IP addresses that GWACF 310 obtained from UPF 308-1, in the request for configuration. When the GWCMF receives the IP addresses, GWCMF may assign the IP addresses to the UPF and/or any other components of a network slice that the GWCMF creates within shared network 108 and within second network 104-2.

In some implementations, GWACF 310 may receive a request to let a UE 102 (e.g., a subscriber device to the first network 104-1) have access to shared network 108, for a service. When GWACF 310 receives the request, GWACF 310 may look up its database of UEs 102 that are authorized to connect to the shared network 108.

GWAFC 310 may or may not find a record corresponding to the ID of the UE 102 in its database. If the ID of the UE 102 is found in the database and UE 102's time for accessing the shared network 108 has not expired, GWACF 310 may send a reply that indicates the UE 102 is authorized. If the time window for accessing the shared network 108 has expired for the UE 102, GWACF 310 may determine if the time window can be extended. If so, GWACF 310 may extend the time window, record the time extension for the UE 102 in the database, and notify the network component which requested the authorization that the request is granted. If the time window cannot be extended, GWACF 310 may send a reply indicating that the request is denied.

If the ID of the UE 102 is not found in the database, GWACF 310 may respond differently to the request, depending on from where the request originated. For example, the request may be from a GWCMF in the second network 104-2 or from a network component within network 104-1. If the request is from the GWCMF in second network 104-2, GWACF 310 may deny the request for authorization.

If the request is from within network 104-1, GWACF 310 may query UDM 306-1 to determine whether the UE 102 has the privilege to access shared network 108 based on the user profile associated with the UE 102. If the UE 102 has the privilege, GWACF 310 may request SIM-OTA 312 to update the SIM of the UE 102, providing SIM-OTA 312 with the APN for UPF 308-1. After the SIM update, GWACF 310 may perform any necessary bookkeeping activities, such as altering the user profile associated with the UE 102 in UDM 306-1 to indicate the SIM update.

SIM-OTA 312 may provide updates to SIMs in UEs 102. In particular, SIM-OTA 312 may receive instructions from GWACF 310 to update the SIM at UE 102 with the APN (e.g., for a particular service), either to store the APN in the SIM or to delete the APN from the SIM. Since SIM-OTA 312 performs OTA SIM updates as a service, information that is used to update the SIM is sent to UE 102 over the user plane. After the update, SIM 312, or alternatively, GWACF 310 may modify the user profile associated with the UE 102 in UDM 306-1 to indicate that the SIM if UE 102 has been updated.

Figure 4:
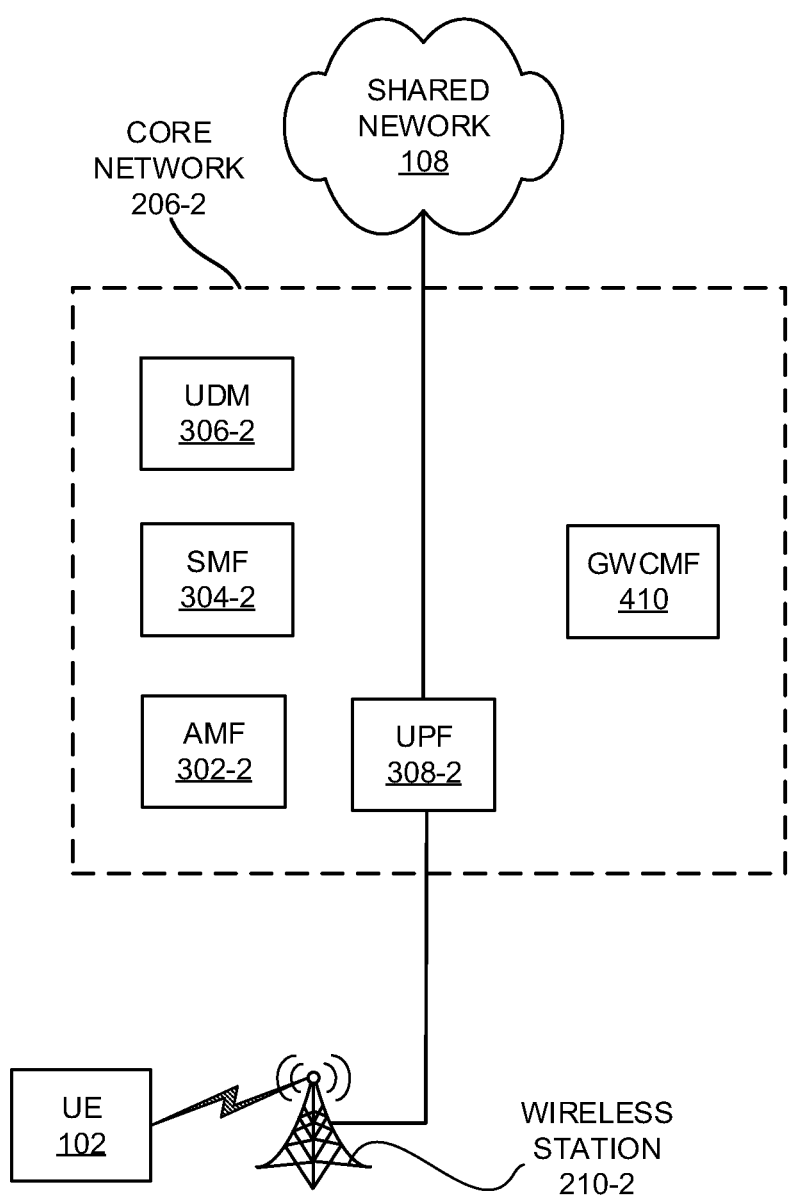
FIG. 4 shows exemplary components of the core network in a wireless network when the wireless network is implemented as a Fifth Generation (5G) network according to another embodiment.

FIG. 4 shows exemplary components in core network 206-2 of second network 104-2 of FIG. 1 when second network 104-2 is implemented as network 104 of FIG. 2. More specifically, FIG. 4 shows core network components when core network 206-2 is implemented as a 5G core network. As shown in FIG. 4, core network 206-2 may comprise a number of NFs, which include: an AMF 302-2, a SMF 304-2, a UDM 306-2, a UPF 308-2, and a GWCMF 410. Although core network 206-2 may include additional components, they are not illustrated in FIG. 4 for simplicity.

Each of the components 302-2 through 308-2 in core network 206-2 operates similarly as the corresponding core components 302-1 through 308-1 in core network 206-1.

GWCMF 410 may receive requests from a client application (e.g., GWACF 310) to configure a gateway, within shared network 108, for shared network 108 and perform its configuration. The request may provide the APN for UPF 308-1 and at least one IP address. Upon receipt of the APN and the IP address, GWCMF 410 may instantiate a UPF 308-2 for shared network 108, or alternatively, configure already existing UPF 308-2, such that UPF 308-2 is associated with the APN and the IP address.

GWCMF 410 may also receive requests from a network component in core network 206-2 to authorize a UE 102 that has attached to network 104-2 to access shared network 108. Upon receipt of the request, GWCMF 410 may call GWACF 310 in core network 206-1 and request GWACF 310 to determine whether the UE 102 should be authorized. Depending on the reply from GWACF 310, GWCMF 410 may or may not authorize the UE 102 to access shared network 108.

In FIGS. 3 and 4, core networks 206-1 and 206-2 are shown as 5G core networks. In other implementations, core networks 206-1 and 206-2 may include other types of core network components, such as 4G core network components. For example, in place of AMFs 302-1 and 302-2, SMFs 304-1 and 304-2, UDMs 306-1 and 306-2, UPFs 308-1 and 308-2, the core networks 206-1 and 206-2 may include a Mobility Management Entity (MME), a Serving Gateway (SGW), Home Subscriber Server (HSS), Packet data network Gateway (PGW). Such implementations of core networks 206-1 and 206-2 may include GWACF 310, SIM-OTA 312, and GWCMF 410.

Figure 5:
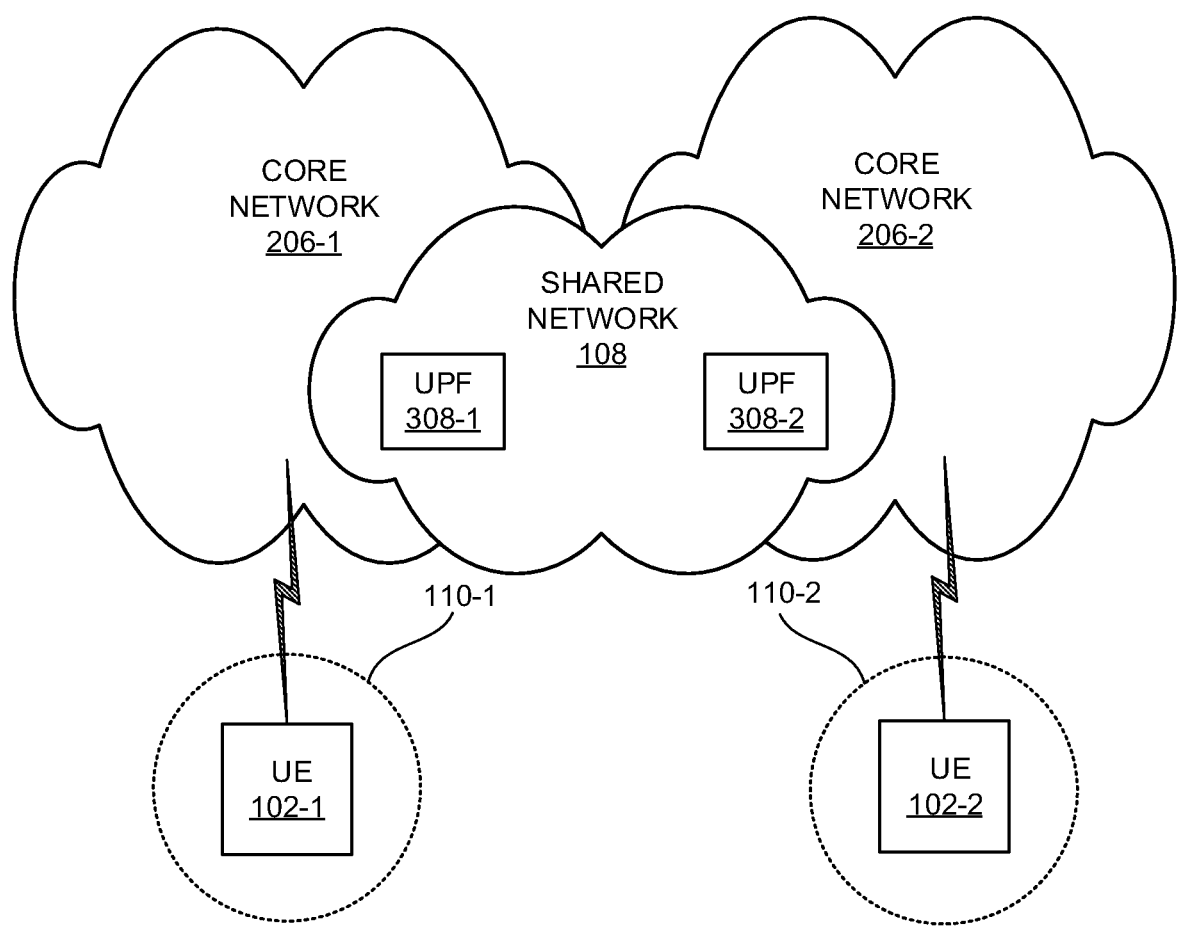
FIG. 5 illustrates exemplary use cases for the core network components according to one implementation.

FIG. 5 illustrates exemplary use cases for the network components of FIGS. 3 and 4. As discussed with reference to FIG. 1, shared network 108 offers a particular service. Assume that in FIG. 5 that a UE 102-1 at location 110-1 has access to shared network 108 to receive the service. Also assume that core network 206-1 belongs to a private network, core network 206-2 belongs to a service provider network (also "provider network"), and that both core networks 206-1 and 206-2 include the shared network 108. The components described above with reference to FIGS. 3 and 4 permit the UE 102=2 in location 110-2 to access the particular service. If second network 104-2 has far greater presence than first network 104-1 (i.e., has far greater coverage area), first network 104-1 may leverage the presence of second network 104-2 and offer the service to subscribers of the second network 104-2.

In one implementation, to allow UE 102-2 to access the service, a network operator may use a client application to access GWACF 310 in its core network 206-1. GWACF 310 may have been downloaded from a provider network, installed in core network 206-1, and configured for operation.

If a UPF 308-1 exists but has not been configured with an APN, GWACF 310 in core network 206-1 may set the APN (received from the network operator via the client application) for UPF 308-1. On the other hand, if the UPF 308-1 does not yet exist in core network 206-1, GWACF 310 may instantiate a UPF 308-1 that has the APN or a network slice including a new UPF 308-1 with the APN. GWACF 310 may further configure the UPF 308-1 to act as a gateway to shared network 108. Such UPF 308-1 is part of shared network 108. In addition, GWACF 310 may call GWCMF 410 in core network 206-2, instructing GWCMF 410 to have a UPF 308-2 (also part of shared network 108) to act as a gateway to shared network 108 within core network 206-2. If the UPF 308-2 does not exist, GWCMF 410 may instantiate the UPF 308-2 or a network slice that includes the UPF 308-2. GWCMF 410 may also receive an APN and IP addresses. The APN may be the same APN for UPF 308-1, and GWQCMF 410 may use the APN to configure UPF 308-2. UPF 308-2 thus would have the same APN as UPF 308-1 after the configuration. UPF 308-2 may be assigned the IP address from GWACF 310. The IP address of UPF 308-2 is different from the IP address of UPF 308-1.

In FIG. 5, assuming for the moment that UE 102-1 is aware of the APN for UPF 308-1 for shared network 108, when UE 102 is in location 110-1, UE 102 may access the service provided by shared network 108. UE 102-2 in location 110-2, although not a subscriber of first network 104-1, UE 102-2 may attach to core network 206-2 and still access shared network 108, using the same APN, through UPF 308-2—since UPF 308-2 has the same APN as UPF 308-1.

Depending on the use case, when the network operator interacts with GWACF 310, it may not be known which UEs 102 need to have access to shared network 108 through either core network 206-1. If UEs 102 that are to have access through network 206-1 have been identified, but have not yet been configured, the network operator may provide the list of the UEs 102 to GWACF 310. GWACF 310 may then forward a request to SIM-OTA 312 to update the SIMs in the identified UEs 102. After the UE updates, UDM 306-1 may also be updated to reflect that the APN for the service is stored in the SIMs of the UEs 102.

In some implementations, UEs 102 that do not have the APN may still request network 206-1 to provide the service. When core network 206-1 receives such a request for a UE 102, GWACF 310 may query UDM 306-1 to determine whether the UE 102 is authorized to access the service. If so, GWACF 310 may instruct SIM-OTA 312 to update the SIM in the UE 102.

Figure 6:
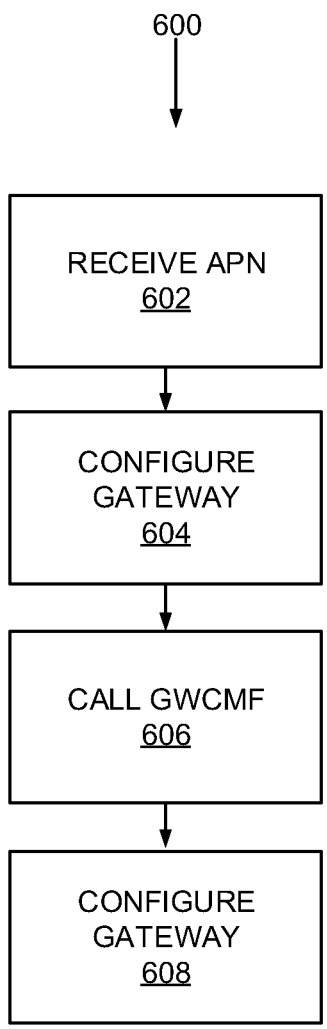
FIG. 6 is a flow diagram of an exemplary process that is associated with configuring a gateway in a wireless network to provide access to the shared network within the wireless network, according to one implementation.

FIG. 6 is a flow diagram of an exemplary process 600 that is associated with configuring first network 104-1 to provide access to shared network 108, according to one implementation. Process 600 may be performed by, for example, GWACF 310, SIM-OTA 312, GWCMF 410, and other network elements in core networks 206-1 and 206-2. For process 600, assume that GWACF 310 has the capability to interact with GWCMF 410 in network 206-2 and that the network operator wishes to configure core networks 206-1 and 206-2 to support UE access to shared network 108 through core network 206-1 and core network 206-2.

As shown, process 600 may include GWACF 310 receiving an APN from the network operator (block 602). Upon receipt of the APN, GWACF 310 may configure its gateway, such as UPF 308-1, for shared network 108 (block 604). As a result of the configuration, UPF 308-1 may be associated with the APN.

Process 600 may further include GWACF 310 calling GWCMF 410 (block 606) and providing the APN and one or more IP addresses to GWCMF 410. GWACF 310 may have obtained the IP addresses from UPF 308-1. When GWCMF 410 in network 206-2 receives the APN from GWACF 310, GWCMF 410 configures UPF 308-2, the gateway to shared network 108, so that UPF 308-2 has the same APN as UPF 308-1 (block 608) and the received IP address. The received IP address is different from the IP address of UPF 308-1. If no UPF 308-2 exists for shared network 108, GWCMF 410 may instantiate a new UPF 308-2 with the APN and the received IP address. After the completion of process 600, a UE 102 that has the APN may access shared network 108 through either network 104-1. UE 102-2 may access shared network 108 through network 104-2.

Figure 7:
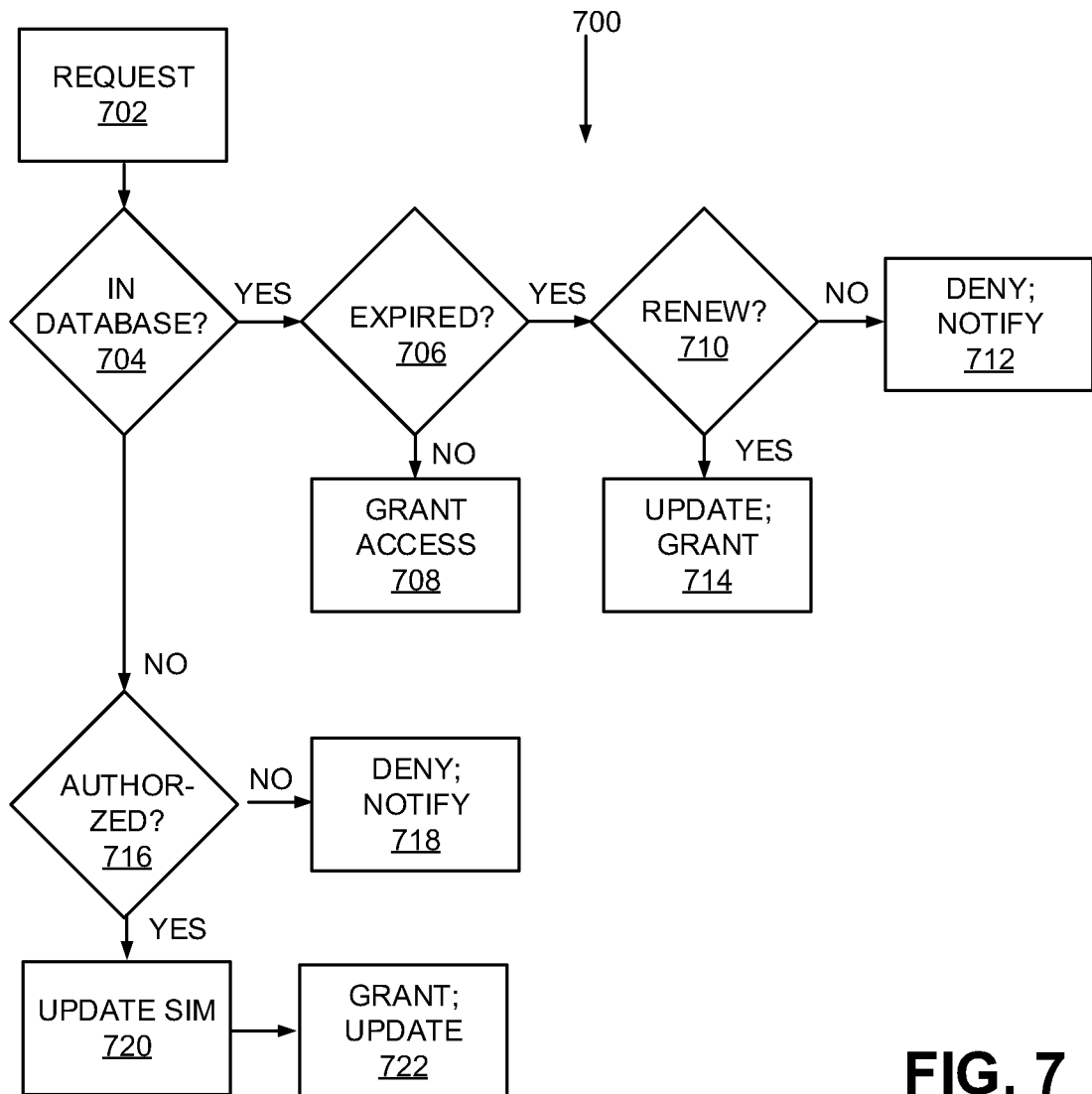
FIG. 7 is a flow diagram of an exemplary process that is associated with configuring a user equipment device (UE) to permit the UE to access the shared network through a wireless network, according to one implementation.

FIG. 7 is a flow diagram of another exemplary process 700 that is associated with providing UEs 102 with access to shared network 108 through networks 104-1 and 104-2. More particularly, process 700 is associated with configuring UEs 102-1 so that they can access shared network 108 through core network 206-1 and UEs 102-2 can access shared network 108 through core network 206-2. Like process 600, process 700 may be performed by, for example, GWACF 310, SIM-OTA 312, GWCMF 410, and/or other network components in networks 206-1 and 206-2. For process 700, assume that UPF 308-1 in core network 206-1 and UPF 308-2 in core network 206-2 have been configured to support possible UE 102-1 and 102-2 access to shared network 108, through network 104-1 and 104-2 respectively. For process 700, UPF 308-1 and UPF 308-2 have the same APN.

As shown, process 700 may include GWACF 310 receiving a request to grant access to shared network 108 (block 702) from a network component. For example, GWACF 310 may receive a request to access shared network 108 from AMF 302-1, SMF 304-1, or GWCMF 410 in core network 206-2. In response, GWACF 310 may check its database to determine whether the ID for the UE 102 is in its list of UE IDs, corresponding to UEs 102 that are authorized to access shared network 108 (block 704).

Figure 8:
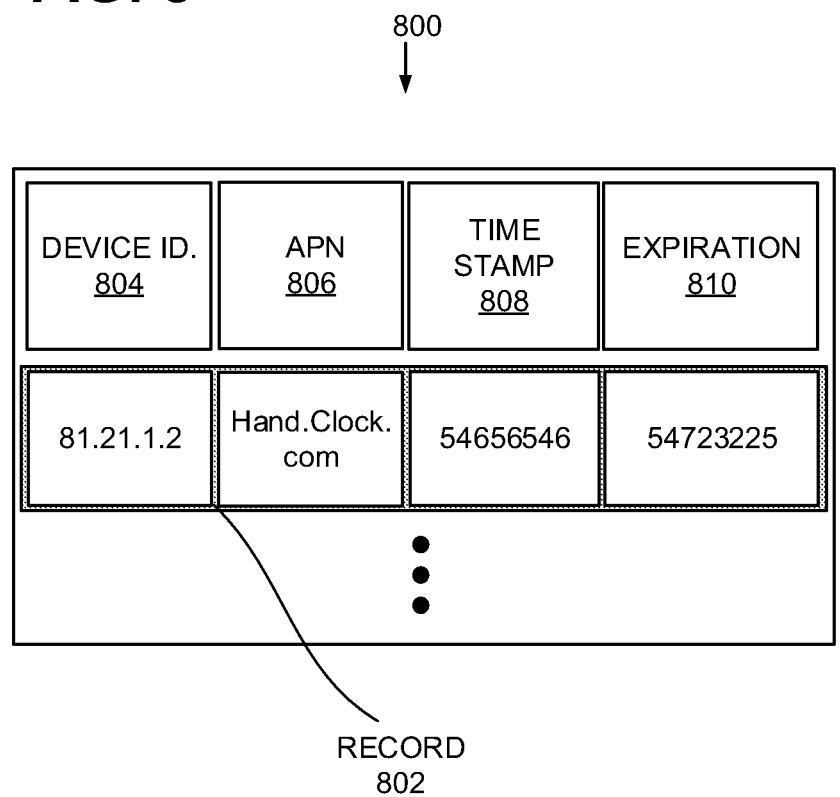
FIG. 8 depicts an exemplary contents of a database in Gateway Access Control Function (GWACF), according to one embodiment.

FIG. 8 depicts an exemplary contents of a database 800 in GWACF 310 in core network 206-1. As shown, database 800 may include one or more records 802. Each record 802 may include the following fields: a device ID field 804, an APN field 806, a time stamp field 808, and an expiration field 810. Depending on the implementation, record 802 may include additional, fewer, different, or a different arrangement of fields than those illustrated in FIG. 8. For example, a record 802 may include fields for indicating authorization levels, qualify-of-service, restrictions, access history, etc.

Device ID field 804 may indicate an ID for a UE 102. Examples of ID may include a Mobile Station International Subscriber Directory Number (MSISDN), an International Mobile Subscription Identifier (IMSI), a Media Access Control (MAC) address, an IP address, etc. APN field 806 may include the APNs for shared networks (those gateways belonging to the same domain) which the UE is authorized to access. Because the UE 102 may access more than one shared network 108, APN field 806 may include more than one APN. Time stamp field 808 may include, for each of the APNs listed in APN field 806, the time at which the corresponding shared network 108 was last accessed. Expiration field 810 may include, for each of the APNs listed in APN field 806, the time at which the UE 102 is no longer authorized to access the shared network 108 with which the APN is associated.

Returning to FIG. 7, if an ID for the UE 102 is in database 800, GWACF 310 may determine whether the UE 102's time window for accessing shared network 108 has expired, by comparing the contents of the expiration field 810 to the current time for the shared network 108 (block 706). If the access time has not expired (block 706: NO), GWAMF 310 may grant access to shared network 108 (block 708). In addition, depending on the implementation, GWACF 310 may update any database (e.g., a Unified Data Repository (UDR)) to reflect the changes.

At block 706, if the access time for the UE 102 has expired (block 706: YES), GWACF 310 may determine whether the UE 102's access time can be renewed (block 710). The determination can be made in many ways. For example, GWACF 310 may query a network operator whether the access time for the UE 102 can be renewed or extended. In a different implementation, GWACF 310 may consult UDM 306-1 for the user profile associated with the UE 102, to determine whether the UE 102 can continue to access shared network 108. If GWACF 310 determines that the access time window can be renewed or extended (block 710: YES), GWACF 310 may update the expiration field 810 in the record 802 for the UE 102 regarding the APN (block 714). GWACF 310 may then provide a response to the request, authorizing the UE 102 to access shared network 108 (block 714). If the UE 102's access time window cannot be renewed or extended (block 710: NO), GWACF 310 may notify the requesting network component that the request for authorization is denied (block 712).

Returning to block 704, if the ID for the ID for the UE 102 is not in database 800 (block 704: NO), GWACF 310 may determine whether the UE 102 is authorized to access shared network 108 (block 716). For example, GWACF 310 may look up the user profile which is associated with the UE 102 (e.g., by contacting UDM 306-1). In another example, GWACF 310 may request the network operator to provide an indication whether the UE 102 is authorized to access shared network 108.

At bock 716, if the UE 102 is not authorized to access network 108 (block 716: NO), GWACF 310 may reply to the network component which requested the authorization for the UE 102 to access shared network 108, indicating the request is denied (block 718). If the UE 102 is authorized (block 716: YES), GWACF 310 may instruct SIM-OTA 312 to update the SIM of the UE 102 with the APN associated with the gateway for shared network 108 (e.g., the APN for UPF 308-1) (block 720). After SIM-OTA 312 updates the SIM of the UE 102 in accordance with the instruction, GWACF 310 may create a record 802 for the UE 102 in database 800, with appropriate values for the fields 804-810. If there is already an entry for the UE 102 (e.g., for another shared network 108 with an APN), GWACF 310 may update the fields in the existing record 802 for the UE 102 (block 722). For example, GWACF 310 may modify the APN field 806 so that the field includes the APN, modify the time stamp field 808 to include the current time as the access time, and modify the expiration field 810 to include the expiration time for the APN.

Once a UE 102 has been granted access to shared network 108, the SIM for the UE 102 has been updated with the APN, and the record for the UE 102 in database 800 has been created or updated, the UE 102 may access shared network 108 from any location at which network 104-1 and network 104-2 have presence.

Figure 9:
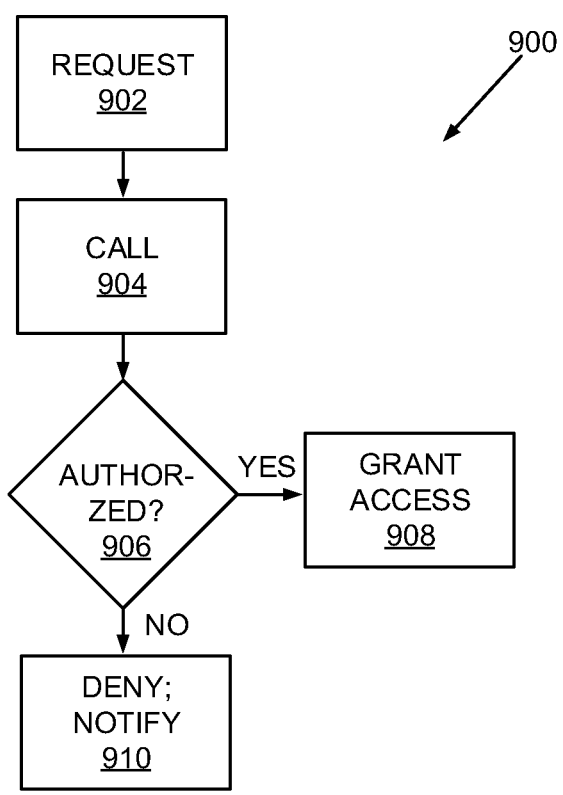
FIG. 9 is a flow diagram of an exemplary process that is associated with responding to a request from a UE to connect to the shared network through a wireless network according to one embodiment.

FIG. 9 is a flow diagram of an exemplary process 900 that is associated with accessing shared network 108 through second network 104-2. For FIG. 9, assume that UE 102 I subscribed to second network 104-2. When the UE 102 connects to core network 206-2, the UE 102 may request access to shared network 108 through its gateway—UPF 308-2. The UE 102 may identify the gateway through which it wishes to receive the service from shared network 108, by providing the APN to core network 206-2.

As shown, process 900 may include GWCMF 410 in core network 206-2 receiving a request, from a network component within core network 206-2, to authorize the UE 102 to access shared network 108 through UPF 308-2 (block 902). Upon receipt of the request, GWCMF 410 may call GWACF 310 in core network 206-1, to determine whether the UE 102 is authorized (block 904). In response, GWACF 310 may consult a database of users that are subscribed to the service provided by shared network 108, performing any authentication process associated with its access. GWACF 310 may return an indication to GWCMF 410 as to whether the UE 102 is authorized to access shared network 108 through UPF 308-2 in core network 206-2.

If GWACF 310 indicates to GWCMF 410 that the UE 102 is authorized (block 906: YES), GWCMF 410 may grant the UE 102 the authorization to access shared network 108 over network 104-2. Otherwise (block 908; NO), GWCMF 410 in may deny the UE 102 access to shared network 108. If the request is granted, the UE 102 may receive its services from shared network 108 through UPF 308-2.

As mentioned above with reference to FIG. 2, first network 104-1 may be implemented differently than network 104. FIG. 10 illustrates an implementation, of first network 104-1, that is different from network 104. In FIG. 10, network 104-1 is implemented as network 1000. In contrast to network 104, network 1000 is more compact, and includes access network 204 and shared network 108. Shared network 108 is coupled to access network 204 through a high bandwidth backhaul. Shared network 108 includes UPF 308, or alternatively, a gateway that operates similarly as UPF 308. Although not shown, access network 204 or shared network may also include a GWACF 310.

In network 1000, GWACF 310 within network 1000 may operate similarly as GWACF 310 in network 104-1. In addition, network 104-2 may configure and access its UPF 308 (on shared network 108) in a manner similar to that described above, for the case where network 104-1 is implemented as network 104. Accordingly, UEs 102 that are subscribed to network 104-2 and are in the coverage area of network 104-2 may have wireless access (e.g., 5G wireless access) to shared network 108 through network 104-2. UEs 102 that are subscribed to network 1000 and in the coverage area of network 1000 may access shared network 108 with minimal latency (e.g., ULLRC access) through network 1000, via the high bandwidth backhaul.

Figure 11:
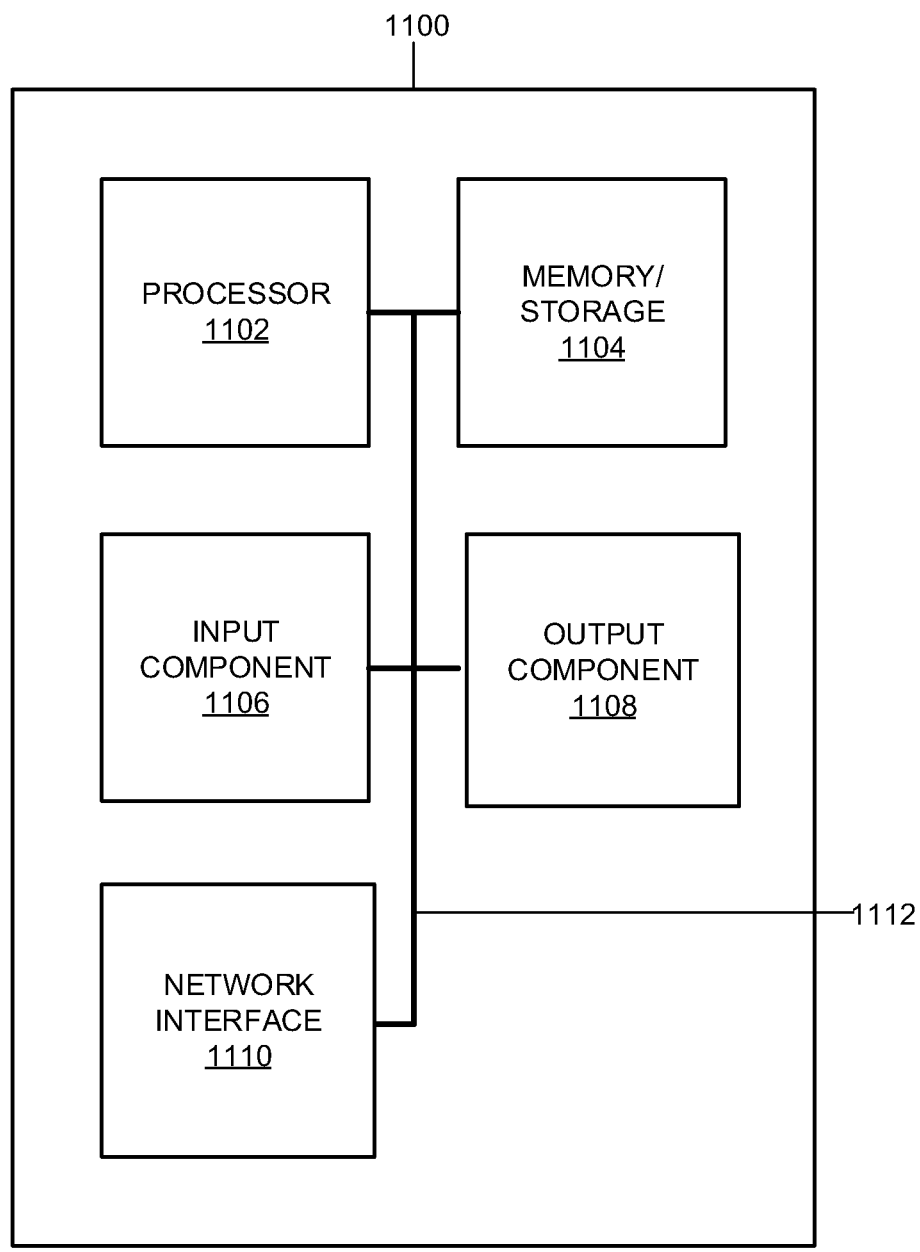
FIG. 11 illustrates exemplary components of a network device.

FIG. 11 is a block diagram of exemplary components of a network device 1100. Network device 1100 may correspond to, or be included in, the devices and/or components of the networks depicted in FIGS. 1-5 and 10 (e.g., UE 102, wireless station 210, a router, a switch, a server, access network 204, core network 206, etc.). As shown, network device 1100 may include a processor 1102, memory/storage 1104, input component 1106, output component 1108, network interface 1110, and communication path 1112. In different implementations, network device 1100 may include additional, fewer, different, or a different arrangement of components than the ones illustrated in FIG. 10.

Processor 1102 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 1100 and/or executing programs/instructions.

Memory/storage 1104 may include static memory, such as read only memory (ROM), and/or dynamic memory, such as random access memory (RAM), or onboard cache, for storing data and machine-readable instructions (e.g., programs, scripts, etc.).

Memory/storage 1104 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 1104 may be external to and/or removable from network device 1100. Memory/storage 1104 may include, for example, a Universal Serial Bus (USB) memory stick, a dongle, a hard disk, off-line storage, a Blu-Ray® disk (BD), etc. Memory/storage 1104 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 1106 and output component 1108 may receive input from a user and provide output to a user. Input/output components 1106 and 1108 may include, for example, a display screen, a keyboard, a mouse, a speaker, a microphone, a camera, a DVD reader, USB lines, and/or other types of components.

Network interface 1110 may include a transceiver (e.g., a transmitter and a receiver) for network device 1100 to communicate with other devices and/or systems. For example, via network interface 1110, network device 1100 may communicate over a network, such as the Internet, an intranet, a terrestrial wireless network (e.g., a WLAN, WiFi, WiMax, etc.), a satellite-based network, optical network, etc. Network interface 1110 may include a modem, an Ethernet interface to a LAN, and/or an interface/connection for connecting device 1100 to other devices (e.g., a Bluetooth interface).

Communication path 1112 may provide an interface (e.g., a bus) through which components of device 1100 can communicate with one another.

In some implementations, network device 1100 may perform the operations described herein in response to processor 1102 executing software instructions stored in a non-transient computer-readable medium, such as memory/storage 1104. The software instructions may be read into memory/storage 1104 from another computer-readable medium or from another device via network interface 1110. The software instructions stored in memory/storage 1104, when executed by processor 1102, may cause processor 1102 to perform processes that are described herein. In other implementations, the instructions may be hard coded.

Figure 12:
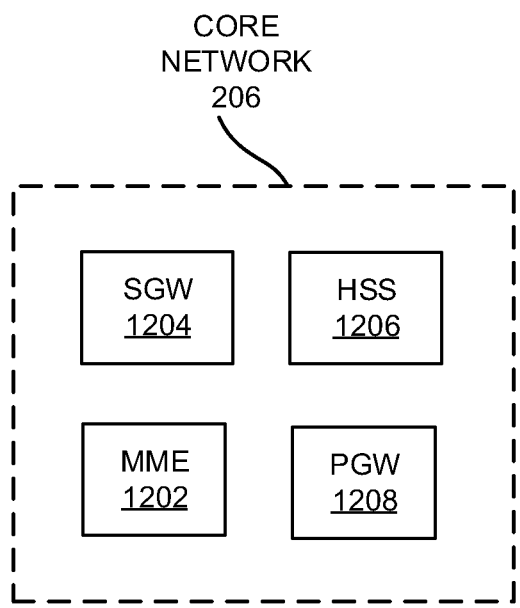
FIG. 12 shows exemplary components in the core network according to another implementation.

FIG. 11 shows exemplary components in core network 206 of FIG. 2 when core network 206 is implemented as 4G core network components. As shown, core network 206 may include a Mobility Management Entity (MME) 1202, a Serving Gateway (SGW) 1204, a Home Subscriber Server (HSS) 1206, and a Packet data network Gateway (PGW) 1208. MME 1202, SGW 1204, HSS 1206, and PGW 1208 roughly operate similarly as AMF 302-1 or 302-2, SMF 304-1 or 304-2, UDM 306-1 or 306-2, and UPF 308-1 or 308-2, respectively. Although core network 206 may include additional 4G core network components, they are not shown in FIG. 12 for simplicity.

In this specification, various preferred embodiments have been described with references to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIGS. 6, 7, and 9, the order of the blocks may be modified in other implementations. In addition, non-dependent blocks may represent blocks that can be performed in parallel.

It will be apparent that aspects described herein may be implemented in many different firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein. For example, although many of the above figures have been described in the context of 5G core network components, in other implementations, corresponding 4G components (or other types of advanced core network components) may replace the 5G components. For example, MMEs, SGWs, HSSs, and PGWs may be used in place of AMFs 302-1 and 302-2, SMFs 304-1 and 304-2, UDMs 306-1 and 306-2 and UPFs 308-1 and 308-2 to implement core networks 206-1 and 206-2, as well as the processes described above.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, block, or instruction used in the present application should be construed as essential to the implementations described herein unless explicitly described as such. As used herein, the articles "a," "an," and "the" are intended to include one or more items. The phrase "based on" is intended to mean "based, at least in part, on" unless explicitly stated otherwise.

What is claimed is:

1. A device comprising:
    a processor configured to:
        when the device is within a coverage area of a first wireless network, send a first request, which includes an Access Point Name (APN), to the first wireless network to access a service provided by a shared network coupled to the first wireless network;
        access the service provided by the shared network through the first wireless network;
        when the device is within a coverage area of a second wireless network, send a second request, which includes the same APN, to the second wireless network to access the service provided by the shared network which is coupled to the second wireless network;
        send an authorization request, to the second wireless network, to authorize the device to access the shared network through the second wireless network, wherein the second wireless network is configured to obtain an authorization, for the device to access the service, from the first wireless network, in response to the authorization request; and
        receive the service provided by the shared network through the second wireless network.

2. The device of claim 1, wherein the first request and the second request are sent to different domains.

3. The device of claim 1, wherein the first request is sent to a Multi-Access Edge Computing cluster.

4. The device of claim 1, wherein the APN identifies a first User Plane Function (UPF) in the first wireless network and a second UPF in the second wireless network.

5. The device of claim 1, wherein the shared network includes a network slice.

6. The device of claim 1, wherein the processor is further configured to:
    send a third request, which includes a second APN, to the first wireless network to access another service provided by another shared network coupled to the first wireless network; and
    send a fourth request, which includes the second APN, to a third wireless network to access the other service provided by the other shared network which is coupled to the third wireless network.

7. The device of claim 1, wherein the first wireless network is configured to determine whether a time for the device to access the shared network has elapsed.

8. A method comprising:
    when a device is within a coverage area of a first wireless network, sending a first request, which includes an Access Point Name (APN), to the first wireless network to access a service provided by a shared network coupled to the first wireless network;
    accessing the service provided by the shared network through the first wireless network;
    when the device is within a coverage area of a second wireless network, sending a second request, which includes the same APN, to the second wireless network to access the service provided by the shared network which is coupled to the second wireless network;
    sending an authorization request, to the second wireless network, to authorize the device to access the shared network through the second wireless network, wherein the second wireless network is configured to obtain an authorization, for the device to access the service, from the first wireless network, in response to the authorization request; and
    receiving the service provided by the shared network through the second wireless network.

9. The method of claim 8, wherein the first request and the second request are sent to different domains.

10. The method of claim 8, wherein the first request is sent to a Multi-Access Edge Computing cluster.

11. The device of claim 8, wherein the APN identifies a first Packet data network Gateway (PGW) in the first wireless network and a second PGW in the second wireless network.

12. The method of claim 8, wherein the shared network includes a network slice.

13. The method of claim 8, further comprising:
sending a third request, which includes a second APN, to the first wireless network to access another service provided by another shared network coupled to the first wireless network; and
sending a fourth request, which includes the second APN, to a third wireless network to access the other service provided by the other shared network which is coupled to the third wireless network.

14. The method of claim 8, wherein the first wireless network is configured to determine whether a time for the device to access the shared network has elapsed.

15. A non-transitory computer-readable medium comprising processor-executable instructions, that when executed cause a processor in a device to:
when the device is within a coverage area of a first wireless network, send a first request, which includes an Access Point Name (APN), to the first wireless network to access a service provided by a shared network coupled to the first wireless network;
access the service provided by the shared network through the first wireless network;
when the device is within a coverage area of a second wireless network, send a second request, which includes the same APN, to the second wireless network to access the service provided by the shared network which is coupled to the second wireless network;
send an authorization request, to the second wireless network, to authorize the device to access the shared network through the second wireless network, wherein the second wireless network is configured to obtain an authorization, for the device to access the service, from the first wireless network, in response to the authorization request; and
receive the service provided by the shared network through the second wireless network.

16. The non-transitory computer-readable medium of claim 15, wherein the first request and the second request are sent to different domains.

17. The non-transitory computer-readable medium of claim 15, wherein the first request is sent to a Multi-Access Edge Computing cluster.

18. The non-transitory computer-readable medium of claim 15, wherein the APN identifies a first User Plane Function (UPF) in the first wireless network and a second UPF in the second wireless network.

19. The non-transitory computer-readable medium of claim 15, wherein the shared network includes a network slice.

20. The non-transitory computer-readable medium of claim 15, wherein the first wireless network is configured to determine whether a time for the device to access the shared network has elapsed.

\* \* \* \* \*